United States Patent [19]

Onksen et al.

[11] 4,349,281

[45] Sep. 14, 1982

[54] TEMPERATURE SENSOR ASSEMBLY APPARATUS

[75] Inventors: Peter J. Onksen, Merrimack, N.H.; Leonard Spadafora, North Tewksbury, Mass.

[73] Assignee: Pacer Systems, Inc., Burlington, Mass.

[21] Appl. No.: 150,117

[22] Filed: May 15, 1980

[51] Int. Cl.³ .......................... G01K 1/14; G01K 1/16
[52] U.S. Cl. ..................................... 374/136; 374/165
[58] Field of Search ................. 73/339 C, 349, 362.8, 73/343 R, 178 H, 181, 182, 183, 861.01, 861.02, 861.03; 338/28; 244/17.13

[56] References Cited

U.S. PATENT DOCUMENTS

| 1,605,057 | 11/1926 | Nichols | 73/362.8 |
|---|---|---|---|
| 2,588,840 | 3/1952 | Howland | 73/349 |
| 2,828,673 | 3/1959 | Christensen | 73/343 R |
| 2,942,472 | 6/1960 | Harney | 73/349 |
| 2,970,475 | 2/1961 | Werner | 73/349 |
| 3,373,605 | 3/1968 | Beilman | 73/182 |
| 3,400,584 | 9/1968 | Beilman | 73/182 |
| 3,590,636 | 7/1971 | Eddy | 73/178 H |
| 3,623,367 | 11/1971 | Benedict | 73/349 |
| 3,726,139 | 4/1973 | Beilman | 73/178 H |
| 4,074,570 | 2/1978 | Beilman | 73/182 |

OTHER PUBLICATIONS

Instruments, Jan. 1938, p. 15.

Primary Examiner—Stuart S. Levy
Assistant Examiner—Denis E. Corr
Attorney, Agent, or Firm—James C. Wray

[57] ABSTRACT

A temperature sensor for mounting on a mast of a helicopter has a heat sensor positioned within a central openining in a radially finned heat exchanger. The heat sensor and heat exchanger are spaced rearward from the mast on a tubular sensor support. Long wires helically coiled within the sensor support connect the sensor and terminals on a bracket soldered to the mounting base. The rearward mounting of the heat sensor and the spacing of the heat exchanger and sensor from the mast on the sensor support and the coiling of a long wire within the sensor support between the sensor and terminals on the base and the filling of the sensor support with polyurethane foam resin ensure that the sensor senses air temperature remote from its base and does not sense temperature of the element on which the base is mounted.

10 Claims, 4 Drawing Figures

TEMPERATURE SENSOR ASSEMBLY APPARATUS

BACKGROUND OF THE INVENTION

The invention relates to mounting for heat sensors.

Sensing precise air temperature is important in aircraft operation and is critical in helicopter operation. Air density is one of the most important considerations in determining takeoff and landing speed requirements and weight carrying capabilities of aircraft and load carrying and operational characteristics of helicopters. Precise airspeed measurements are critical in helicopter operation and precise airspeed measurements depend upon precise measurements of air temperature and density.

Air temperature sensors of the prior art have encountered problems among which are the tendency to sense temperature of the surface of the object on which they are mounted, rather than the true temperature which surrounds the object and the tendency to sense temperatures which are altered by the impacting of air on the sensor. Another problem of precise air temperature measurement has been the false measuring of temperatures conducted or radiated through hollow spaces towards the heat sensor from its mounting. Other problems have caused false readings due to thermal conduction along the electrical connections of the heat sensor.

Temperature sensors mounted for example, on helicopter bodies suffer problems of impact air, dust, sand, rain or ice when a sensor is mounted on an upper part of a helicopter body and mishandling and damage when mounted on a lower part of helicopter fuselage.

SUMMARY OF THE INVENTION

The present invention overcomes problems of the prior art. A heat sensor is mounted on a support which extends rearward from an upward extension of a helicopter mast.

The temperature sensor, typically an active electronic device such as made and sold by Analog Devices, catalog number AD590LH is mounted on an omnidirectional airspeed sensor, which in turn is mounted on top of a mast of a helicopter. Since the probe is mounted to the rear of the omnidirectional airspeed sensor body, the mounting provides for the best available protection of the temperature probe from impact air, dust, sand, rain or ice. Since the temperature probe is mounted above the main rotor hub, it is free of impact due to high downwash velocities of the main rotor. The temperature probe is also free of mishandling which might occur on a lower fuselage location. The temperature sensor is isolated from the omnidirectional airspeed body by insulated material. The probe is well displaced from anti-icing heating elements on the ends of the omnidirectional airspeed sensor arms.

A temperature sensor for mounting on a mast of a helicopter has a heat sensor positioned within a central opening in a radially finned heat exchanger. The heat sensor and heat exchanger are spaced rearward from the mast on a tubular sensor support. Long wires helically coiled within the sensor support connect the sensor and terminals on a bracket soldered to the mounting base. The rearward mounting of the heat sensor and the spacing of the heat exchanger and sensor from the mast on the sensor support and the coiling of a long wire within the sensor support between the sensor and terminals on the base and the filling of the sensor support with polyurethane foam resin ensure that the sensor senses air temperature remote from its base and does not sense temperature of the element on which the base is mounted.

Typically, an omnidirectional airspeed sensor has a cylindrical canister of which a larger lower portion is positioned within a portion of a helicopter mast which extends upward from the rudders.

An upper portion of the containment member extends upward from the mast extension, and a rotating arm support mast extends upward from the containment member. A motor in the containment member drives a vertical shaft to which a rotating arm is attached. A rotational angle sensor within the containment members senses the speed and instaneous rotational position of the shaft. The rotating arm extends in opposite senses of direction atop the shaft, and opposite distal ends of the arms have pressure sampling means. A differential pressure transducer atop the rotating shaft senses the pressure differential between opposite ends of the arms. The pressure differential is related to the speed of the aircraft in a direction perpendicular to the instaneous position of the arms as sensed by the shaft rotational angle position sensor. Precise airspeed measurement depends upon measuring the air density. Precise air density measurement depends upon precise air temperature measurement.

The temperature sensor assembly apparatus of the present invention is mounted on an aircraft, typically a helicopter, on an upward extension of the mast above the rotor. Preferably, the temperature sensor assembly apparatus is mounted on a vertical mast which supports a vertical rotating shaft on which a rotating omnidirectional speed sensing element is mounted. The temperature sensor is mounted rearward of the mast on a heat isolating tube and within a ambient heat collecting heat exchanger which radiates outward from the distal end of the sensor support. A proximal end of the sensor support is anchored within a recess in a base which is secured to the mast. A terminal bracket is adhesively secured to an opposite side of the base within the mast, and terminals on the bracket are connected to the heat sensor by a long helically looped connector which includes plural wires. The sensor support is filled and the wires are surrounded with a polyurethane foam resin. Preferably the sensor support is constructed of a non-heat conducting material such as a tough form sustaining plastic. Preferably the sensor support is constructed of a non-heat absorbing material or is coated with a white color paste dispersion to reflect radiant heat. The same white color paste dispersion is used to coat some or all exposed surfaces of the heat exchanger to ensure that the heat exchanger receives ambient air temperature rather than radiant heat.

The present invention provides a temperature sensor assembly apparatus having a base, mounting means connected to the base, a tubular sensor support cantilevered outward from the base and having a proximal end fixed in the base and a distal end remote from the base. A temperature sensor is mounted in the distal end. Plural terminals are connected to the base, and electrical conductive means connected between the plural terminals and the temperature sensor extend through the tubular sensor support. Preferably the electrical conductive means is looped through the tubular sensor support. Typically the electrical conductive means is helically looped through the tubular sensor support.

In the preferred embodiment a heat exchanger support means is mounted on the distal end of the tubular sensor support, and a finned heat exchanger is mounted on the heat exchanger support. Preferably a heat exchanger has a center portion and has plural radially extending fins. The heat exchanger center section is a tubular portion mounted in axial alignment with the tubular sensor support, and the fins entend radially from the center section. The temperature sensor is mounted within the central section of the heat exchanger support and within the distal end of the tubular sensor support. Preferably the temperature sensor assembly base is mounted rearward on a generally vertically oriented mast.

These and further objects and features of the invention are apparent in the disclosure which includes the above and ongoing specification with the claims and the drawings.

DETAILED DESCRIPTION OF THE DRAWINGS

Figure 1:
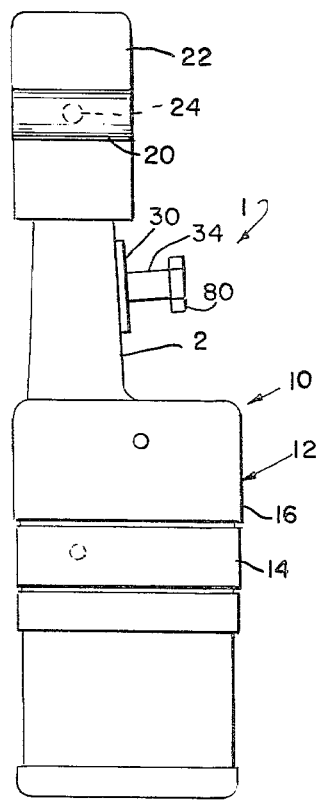
FIG. 1 shows the heat sensor assembly apparatus mounted rearward on a vertically oriented mast of a omnidirectional airspeed sensor.

Referring to FIG. 1, a temperature sensor assembly apparatus is generally indicated by the numeral 1. Assembly 1 is mounted rearward on an auxiliary mast 2 of an omnidirectional airspeed sensor generally indicated by the number 10. Sensor 10 has a cylindrical body 12, with a lower portion 14, which fits within an upward extension of a main rotor mast on a helicopter above the rotor. The upper portion 16, of the tubular body rests atop the upward mast extension, and auxiliary mast 2 extends upward from the body 12. Within body 12 are mounted a motor with gears which rotate a shaft which extends upward through mast 2 and an angular position sensor which senses the rotational speed and angular position of the rotating shaft. Shrouds 20 on opposite ends of arms mounted in head 22 have pressure sensors. In FIG. 1, the shrouds 20 are shown in alignment and the arm 24 is shown in perpendicular alignment to the plane of the drawing. A differential pressure sensor in head 22 senses the pressure differential between the pressure receptors in shrouds 20. The pressure differential is related to the speed of the aircraft carrying the omnidirectional airspeed sensor 10, in a direction perpendicular to the rotor shaft 24.

Figure 2:
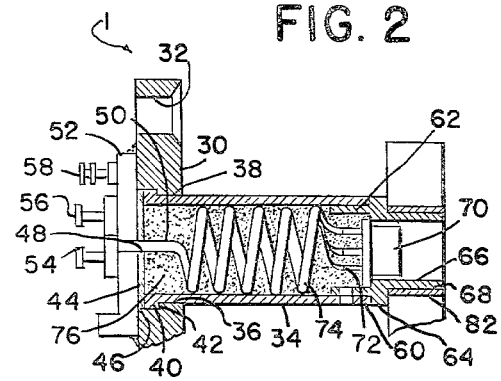
FIG. 2 shows a cross sectional detail of the temperature sensor assembly apparatus.
Figure 3:
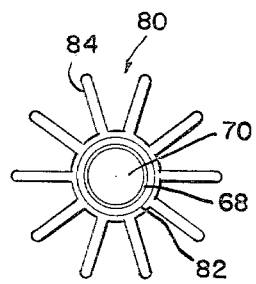
FIG. 3 is a detail of the heat exchanger.

Referring to FIG. 2, the temperature sensor assembly apparatus has a base 30, with countersunk bores 32 for attaching the base to an opening in mast 2. A tubular sensor support 34 has a proximal end 36, which fits within an opening 38 in base plate 30. A lip 40, on proximal end 36, fits within a recess 42, in the base plate. A cap plate 44 has an outer periphery 46, which fits within recess 42 and seals the proximal end of tubular sensor support 34. A central opening 48 in plate 44 receives a multiple wire conductor 50. A terminal bracket 52 has two insulated terminals 54 and 56 and a grounded terminal 58. Distal end 60 of tubular sensor support 34 has fitted therein a proximal end 62 of heat exchanger support 64. A central opening 66 in an outward extended end 68 receives a commercially available heat sensor 70.

Wires 72 lead from the heat sensor 70 into the conductor 50, which has a series of helical loops 74 within the tubular sensor support 34. The interior of the tubular sensor support is filled with polyurethane foam 76, which surrounds the wire 72 and the looped coils 74 of conductor 50.

A heat exchanger 80 has an angular central section 82, which surrounds the extended angular distal portion 68 of the heat exchanger support 64. Plural fins 84 radially extend from the angular section 82. The heat exchanger 80 ensures that the temperature sensed by sensor 70 is the ambient air temperature.

Figure 4:
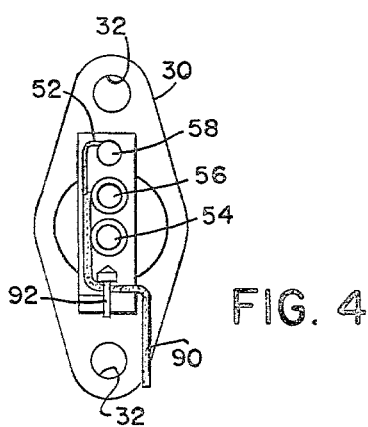
FIG. 4 is a detail of the base and terminal bracket.

As shown in FIG. 4, conductor 90 has wires connected to terminals 54, 56 and 58. A lacing cord 92, forms a stress relief on the terminal-wire connection.

In operation, heat exchanger 80, is interference fit, welded, bonded or braised to heat exchanger support 64. The distal end 60 of tubular sensor support 34 is pushed through opening 38 in the base plate 30, and the tubular support is pushed through the base plate until proximal lip 40 rests against the bottom of recess 42. Lip 40 may be bonded in recess 42 or the elements may be interference fit or otherwise joined as appropriate to the materials.

Conductor 50 is inserted through opening 48 in plate 44 and ends of the conductor are joined with terminals 54, 56 and 58. Opposite ends of wires in the conductor 50 are joined to terminal 72 on sensor 70.

The sensor is introduced through the sensor support 34 to its seat in the heat exchanger support 64 and the sensor is pressed and bonded in place. The conductor is helically coiled in loops 74 and polyurethane resin and a foaming agent are introduced into the cavity of tubular sensor support 34. The plate 44 is inserted into the recess 42 and its peripheries are pressed into the recess and bonded as appropriate. The terminal bracket 52 is then pressed against base plate 30 and is adhesively bonded thereto.

The particular positioning of the heat sensor assembly apparatus on the rear of the auxiliary mast protects the sensor apparatus from impact air, dust, sand, rain or ice. Since the temperature sensor is mounted above the main rotor it is free of impact due to high downwash velocities of the main rotor, and it is free of mishandling which might occur on a lower fuselage location. The temperature sensor is isolated from temperatures of the auxiliary mast which are prevented from conducting along or through the sensor support 34, or the conductor 50. Heat exchanger 80 insures that sensor 70 senses only the ambient air temperature.

While the invention has been described with reference to specific embodiments, it will be obvious to those skilled in the art that modifications and variations of the invention may be constructed without departing from the scope of the invention, which is defined in the following claims.

We claim:

1. Temperature sensor apparatus comprising a base, a heat insulating tube mounted on the base and extending outwardly therefrom, a temperature sensor mounted on the heat insulating tube at a location remote from the base, electrical conductor means extending axially through the heat insulating tube from the temperature sensor to the base in a series of helical loops and terminating at one or more electrical terminals mounted on the base, wherein the heat insulating tube comprises a tubular body having an end mounted on the base and heat insulating material positioned in the tubular body between the base and the temperature sensor.

2. The apparatus of claim 1 wherein the heat insulating material comprises polyurethane foam.

3. The apparatus of claim 1 wherein the tubular body is formed of non-heat conducting material.

4. The apparatus of claim 3 wherein the non-heat conducting material comprises plastic.

5. The apparatus of claim 1 wherein the tubular body is coated with a white paste dispersion for reflecting radiant heat.

6. The apparatus of claim 1 wherein an ambient heat collecting heat exchanger is mounted on the heat insulating tube adjacent the temperature sensor.

7. The apparatus of claim 6 wherein the ambient heat collecting heat exchanger comprises a tubular sensor portion coaxially mounted on the heat insulating tube to form an axial extension thereof and a plurality of fins extending radially outwardly from an outer surface of the tubular center portion, the temperature sensor being positioned within said tubular center portion.

8. The apparatus of claim 7 wherein the tubular center portion is mounted on the heat insulating tube by a heat exchanger support having a first tubular portion matingly received within the end of the heat insulating tube adjacent the temperature sensor, a second tubular portion matingly received within the tubular center portion, and a medial portion between the first and second tubular portions extending radially outwardly between the end of the heat insulating tube and the fins extending outwardly from the tubular center portion.

9. The apparatus of claim 1 wherein the base is provided with a central opening configured to receive an end of the heat insulating tube, the portion of the base bounding said central opening being provided with a shoulder facing away from the temperature sensor, the end of the heat insulating tube received within said opening being provided with a lip configured to matingly abut the shoulder to hold the heat insulating tube within the base.

10. The apparatus of claim 9 further comprising a cap plate mounted in the central opening in abutment with the portion of the lip facing away from the shoulder.

* * * * *